United States Patent [19]

Savit

[11] Patent Number: 4,589,285
[45] Date of Patent: May 20, 1986

[54] WAVELENGTH-DIVISION-MULTIPLEXED RECEIVER ARRAY FOR VERTICAL SEISMIC PROFILING

[75] Inventor: Carl H. Savit, Houston, Tex.

[73] Assignee: Western Geophysical Co. of America, Houston, Tex.

[21] Appl. No.: 668,567

[22] Filed: Nov. 5, 1984

[51] Int. Cl.⁴ .......................................... G01N 29/00
[52] U.S. Cl. ...................................... 73/655; 367/149
[58] Field of Search ................... 73/655, 643, 152; 367/149; 455/614; 356/73.1; 350/96.13

[56] References Cited

U.S. PATENT DOCUMENTS

| | | | |
|---|---|---|---|
| 4,238,856 | 12/1980 | Bucaro et al. | 455/614 |
| 4,302,835 | 11/1981 | McMahon | 370/4 |
| 4,320,475 | 3/1982 | Leclerc et al. | 367/149 |
| 4,375,680 | 3/1983 | Cahill et al. | 73/655 |
| 4,469,397 | 9/1984 | Shaw | 350/96.15 |
| 4,525,818 | 6/1985 | Cielo et al. | 73/655 |

Primary Examiner—Anthony V. Ciarlante
Attorney, Agent, or Firm—William A. Knox

[57] ABSTRACT

An optical telemetric system for use in a borehole consists of a bidirectional optical fiber to which are coupled a plurality of acousto-optical seismic sensors. The sensors consist of an optical cavity that becomes resonant at certain wavelengths depending upon parameters of cavity length and index of refraction. Those parameters are capable of being modified on the basis of static and dynamic pressure differences within the borehole. A swept-wavelength laser chirp pulse is launched into the bidirectional optical fiber. The static pressure at each sensor establishes a resonant wavelength that serves as a carrier signal. Dynamic pressure changes due to seismic waves, modulate the carrier signal. The modulated carrier signals from each sensor are reradiated through the bidirectional optical fiber in a wavelength-division multiplexed format. The multiplexed signals are received by and demultiplexed by a suitable signal receiving apparatus.

1 Claim, 3 Drawing Figures

WAVELENGTH-DIVISION-MULTIPLEXED RECEIVER ARRAY FOR VERTICAL SEISMIC PROFILING

BACKGROUND OF THE INVENTION

1. Field of the Invention

This invention relates to a fiber-optic sensor array for use in vertical seismic profiling.

2. Description of the Prior Art

Vertical seismic profiling (VSP) is a method of determining acoustic wave characteristics of rock layers in situ. The method includes lowering one or several sensors in a well bore to a preselected depth. Use of several spaced-apart sensors fastened to the single cable allows coverage over a preselected depth interval. A seismic signal generated at or near the surface of the earth propagates through the earth and is received by the sensors. The sensors convert the acoustic energy to analog electrical impulses which are transmitted by the cable to the surface to a suitable processor and recorder.

Conventional VSP sensors are of many types including piezoelectric hydrophones, moving-coil geophones, variable-reluctance geophones, and magnetostrictive transducers. When excited by acoustic energy the sensors produce electrical analog signals that are representative of the time-variant pressure changes or the particle-velocity in the borehole fluid or sidewalls. Several obstacles arise when using the aforementioned sensors in deep-well velocity surveys.

Conventional pressure-sensitive sensors, such as bender-type piezoelectric hydrophones may become inoperative when subjected to high pressures. The piezoelectric wafers are compressed against a backing plate, preventing the sensor from generating a signal. In extreme cases the active element is crushed.

Velocity-sensitive sensors, such as the GeoSpace WLS-1050 Geophone, are enclosed in watertight sondes so that the sensors are not responsive to hydrostatic pressures. These tools must then, be in direct contact with the well-bore wall to operate efficiently.

A primary disadvantage of using velocity-sensitive sensors in deep-well velocity surveys is one of space. Each sonde is large, often ten feet or more long and several inches in diameter. Usually, each sonde requires its own power supply and may require a separate channel. Because of limitations of the well-bore diameter, and the space required at the surface for the cable drawworks, only a limited number of sondes can be lowered down the well bore. That circumstance limits the sensor density over the desired survey interval.

Optical fibers and waveguides have been used to detect acoustic signals. J. A. Bucaro et al., teaches such a device in U.S. Pat. No. 4,238,856. In another U.S. Pat., No. 4,320,475 to Leclerc et al., a pressure sensor uses a reference-beam fiber and a sensing-beam fiber. A coherent beam of radiation is split to pass through the two fibers. They are then recombined and are allowed to interfere at a detector to measure the amount of acoustic energy exciting the sensing optic fiber as a function of phase shift of the two beams. A disadvantage of the above sensors is that they use signal reference-beam fiber paths which result in relative phase shifts between the two beams that are not related to the signal phase shifts. These spurious shifts are caused by differences in the acoustical/mechanical environment.

Optical fibers have been used in data transmission. U.S. Pat. No. 4,302,835 issued to McMahon teaches a method and apparatus for time-multiplexing signal pulses propagating along a bidirectional optical transmission line from a plurality of successive sensors. By use of evanescent couplers the sensors are coupled in parallel to a transmission line. Pulses transmitted from a source are coupled into the respective sensors where the pulses are data-modulated. The data-modulated pulses are coupled back into the bidirectional line and are returned to a receiver where they are demultiplexed on a time-of-arrival basis.

SUMMARY OF THE INVENTION

In this invention, I provide a wavelength-division multiplexing system for an acousto-optical seismic sensor array for use in a substantially fluid-filled borehole.

In an aspect of this invention, the system includes an elongated cable which includes a bidirectional optical-fiber transmission link. A plurality of acousto-optical seismic sensors, consisting of a one- or multi-turn optical-fiber coil, are coupled to the optical fiber transmission link by means of suitable directional optical couplers. The optical fiber coil making up each sensor acts as a resonant optical cavity to certain discrete wavelengths, as a function of the local static-pressure environment within the borehole fluid. The resonant discrete wavelength under static conditions is the center or reference wavelength. Under dynamic conditions that reference wavelength is data-modulated, that is, wavelength-shifted, by transient pressure variations due to acoustic or seismic signals.

In another aspect of this invention, a swept-wavelength or chirp pulse of radiation is coupled into the optical transmission link. The chirp pulse is received by the respective acousto-optical seismic sensors. The optical cavities in the sensors resonate at some discrete wavelength within the chirp-signal wavelength band, in accordance with the static pressure to which each resonant cavity is exposed. The acousto-optical seismic sensors each re-radiate a pulse into the optical transmission link at their respective pressure-induced discrete wavelengths. Thus there is formed a train of separate radiant pulses, each characterized by a different discrete wavelength, propagating along the optical transmission link.

A demultiplexer, coupled to the optical transmission link, receives and separates the train of discrete-wavelength pulses into a corresponding set of spectral lines. An array of resettable photodetectors associated with said demultiplexer are adjusted and set to measure the level of the radiant flux of the central maximum for each spectral line. The photodetectors convert the received radiation flux of each spectral line to an electrical signal which may be recorded for further processing.

Transient pressure variations due to seismic waves that modulate the discrete-wavelength pulses by small wavelength shifts from the central maximum are seen by the photodetectors as a variation in radiant-flux intensity. The intensity variations are converted to electrical transient signals representative of the seismic waves.

BRIEF DESCRIPTION OF THE DRAWING

A better understanding of the benefits and advantages of my invention may be obtained from the appended detailed description and the drawings, wherein.

DETAILED DESCRIPTION OF THE PREFERRED EMBODIMENT

Figure 1:
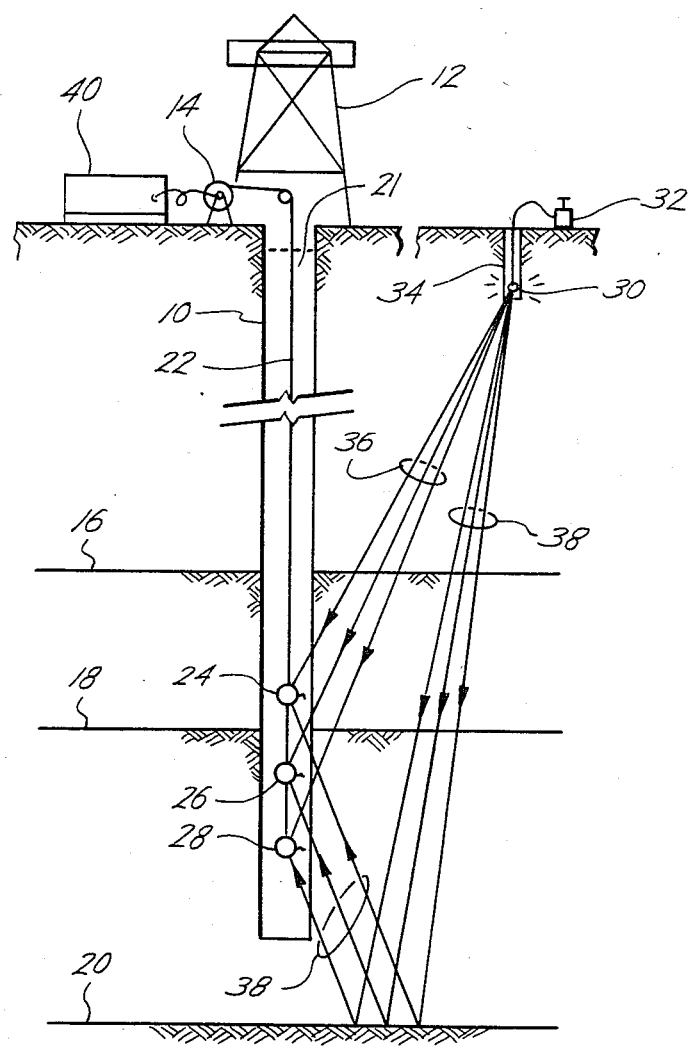
FIG. 1 is a cross section of a portion of the earth showing an acousto-optical sensor array such as provided by my invention deployed in a borehole.

Referring now to FIG. 1, there is shown a borehole 10 such as an oil well. The usual derrick 12, including a cable drawworks 14, is located at the mouth of the borehole. The borehole penetrates various earth layers 16, 18, 20 as shown symbolically and may be 15,000 to 20,000 feet or more deep. Ordinarily the borehole is filled with drilling fluid 21.

During the conduct of a VSP survey, a cable 22, including a number of acoustic-wave sensors such as 24, 26, 28 is lowered into the borehole. Three such sensors are shown, but many more are used in practice. Typically, the sensors are distributed over a desired interval such as 500 feet. For a 50-foot spacing between sensors, eleven sensors would be used. The entire cable is lowered to a desired depth (as measured at the uppermost sensor) such as 1000 feet. An acoustic-wave source such as a small charge of dynamite 30 (a seismic shot), is detonated by a blaster 32 in a shallow shot hole 34 that is offset from the borehole a preferred distance such as 3000 feet. The acoustic waves radiate outwardly from the shot along ray paths 36 directed directly to the sensors and along reflected ray paths 38 from subsurface earth layers. The direct seismic waves and reflected seismic waves are detected by the sensors. The resulting data signals are transmitted through the cable 22 to a signal utilization device 40. After each seismic shot, the cable 22 is repositioned to a new depth level such as 1500 feet, 2000 feet and so on. The sensors are of course, enclosed by a protective housing that is responsive to ambient and transient acoustic pressures.

Data signals from the sensors could be transmitted through separate data channels in the cable. However, because there may be a great many sensors attached to a given length of cable, it is more convenient to multiplex the signals from individual sensors over a single telemetric link. In the present invention, wavelength-division-multiplexing over a single optical-fiber link will be employed and will now be described.

Figure 2:
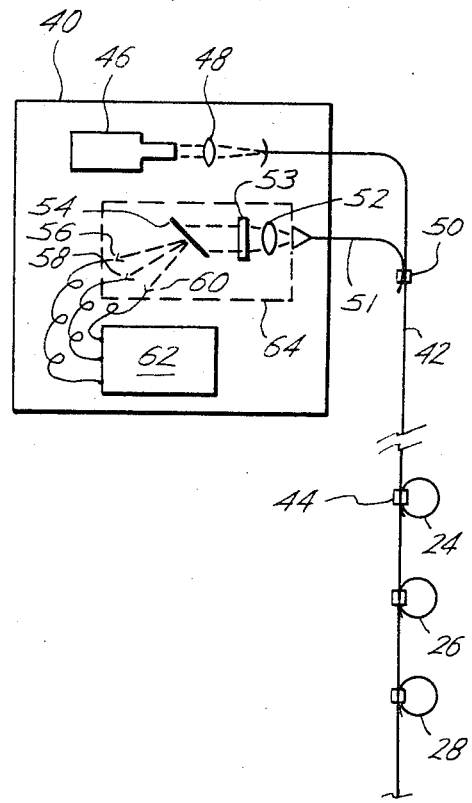
FIG. 2 is a schematic representation of one preferred embodiment of the acousto-optical sensor array.

Referring now to FIG. 2, each sensor such as 24 consists of a one- or more-turn monomodal optical fiber loop. The ends of the coiled fiber may be provided with partially reflective end faces so that the coil acts as a resonant optical cavity for certain discrete wavelengths of electromagnetic radiation. The radiant energy lies preferably in the visible or near infra-red region of the spectrum. The fiber loop becomes a resonant optical cavity for those wavelengths at which the separation of the reflective surfaces is such that internally reflected waves of radiation reinforce each other for a particular wavelength. The optical-fiber loop becomes a type of Fabry-Perot interferometer.

In an alternate embodiment, the resonant cavity that makes up the sensor could consist of an unbroken optical-fiber loop that is coupled back to itself through a bidirectional coupler. The input light pulse sets up a circulating light wave component that cross couples with a straight-through components to constructively interfere therewith at certain wavelengths. See for example, U.S. Pat. No. 4,469,397, which is incorporated herein by reference.

Cable 22 includes a bidirectional monomodal optical fiber transmission link 42. The optical-fiber loops 24, 26, 28 forming the sensors are coupled to the transmission link by conventional directional couplers such as shown symbolically by 44 at sensors 24 and elsewhere. The upper end of fiber 42 communicates with signal utilization device 40.

A wavelength-scanning laser 46 is incorporated into the signal utilization device 40. The scanning laser injects, at timed intervals, a radiation pulse into the transmission link. The radiation pulse is swept or chirped over a restricted wavelength interval. The pulse duration is short, measured in pico seconds, with respect to the total travel time, measured in microseconds, of the pulse through the total length of cable transmission link 42.

As before stated, the respective optical-fiber loops 24, 26, 28 that are the sensors become resonant for discrete wavelengths, depending on certain optical-fiber parameters. Two parameters are of interest, namely: fiber length and index of refraction. If one or the other or both parameters change, the resonant wavelength also changes.

It is well known from the related art above discussed, that ambient environmental pressure differences create changes in the length and refractive index of optical fibers residing in that environment. Therefore, if cable 22 and its sensors 24, 26, 28 are immersed in the borehole fluid 21, the difference in static pressure at each sensor level will cause the optical fiber loops in each of the sensors to become resonant at correspondingly different wavelengths. It is assumed of course, that the sensors had previously been tuned to resonate at identical wavelengths under identical environmental conditions.

The wavelength-scanning laser 46 produces a radiation pulse swept over a limited wavelength band. The wavelength band is chosen to be commensurate with the range of resonant wavelengths that would exist in the sensors due to the depth extremes that would be encountered by the sensors mounted on cable 22 between the top of the borehole and at its total depth.

In a preliminary calibration step, the wavelength-scanning laser 46 injects a chirp pulse of wavelength-swept radiation through a suitable lens 48 into the bidirectional transmission link 42. At each sensor, a portion of the radiant flux of the pulse enters the resonant cavity that forms the first sensor such as 24. The remaining portion of the radiant flux propagates on through the transmission link to the other sensors 26, 28, etc. in turn. At some discrete wavelength within the range of the swept-wavelength radiation chirp pulse, each of the cavities of the respective sensors becomes resonant. That resonant wavelength, hereinafter termed the "central maximum", is then re-radiated from the respective sensors into the bi-directional transmission link 42 for transmission to a wavelength demultiplexer 64 in signal utilization device 40.

Figure 3:
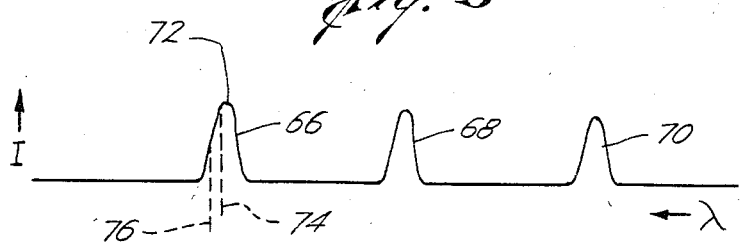
FIG. 3 is the spectrum of a wavelength-division multiplexed data-modulated pulse train received from the sensor array.

Referring for the moment to FIG. 3, there are shown three radiation pulses 66, 68, 70 at three different resonant wavelengths radiated from corresponding resonant optical cavities at different depths. The separation between pulses is related to the difference in ambient fluid pressure. The intensity, I, of the central maximum of a pulse is a function of the insertion loss of the cavity. The pulse width is a function of the optical-fiber parameters, namely the resonator length and index of refraction. In general the resonant wavelengths are blue-shifted as a function of depth.

Thus, the wavelength-swept radiation pulse is transmitted by the bi-directional transmission link to the respective sensors. The resonant cavities of the respective sensors then re-radiate discrete-wavelength pulses to demultiplexer 64 (FIG. 2) in the form of a wavelength-multiplexed stream of radiation pulses. Demultiplexer 64 is coupled to bidirectional transmission link 42 by an evanescent directional coupler 50 and input fiber 51.

Returning now to FIG. 2, the wavelength demultiplexer 53 may for example be a diffraction-grating spectrometer. A lens 52 collimates the radiation pulses from input fiber 51 to grating 54. Diffraction grating 54 may be of the transmission or of the reflection type. The spectrometer may be equipped with an array of several photo detectors 56, 58, 60 equal in number to the several sensors coupled to cable 16. The photodetectors are preferably pivotally mounted around the axis of the diffraction grating at angles corresponding to the central maximum wavelengths of the radiation pulses received from the sensors. Of course, suitable electronic tracking circuitry 62 could be used to automatically center the photodetectors on the central maximum of the spectral lines representative of the respective pulses received from the sensors.

Assuming that the above steps are carried out under static conditions, i.e., the sensors are positioned at a desired depth level in the borehole but with no seismic signals present except for earth unrest, those steps could be considered to be a calibration procedure for that depth level if the angular positions of the photodetectors are locked in place following calibration. It is to be understood that the calibration procedure will be undertaken for each new depth level of the sensors.

For the above type of wavelength demultiplexer, a diffraction grating is preferred because the wavelength value is directly proportional to angular position of the photodetectors 56, 58, 60 with respect to the plane of the grating 54. Assuming that the radiation flux of the received pulses is sufficiently large, the higher-order spectra could be used to obtain greater wavelength dispersion between the wavelength-multiplexed pulse stream. The wavelength range over which the input radiation pulse is swept, is limited to minimize spurious multiple or harmonic output pulses from the resonant-cavity sensors. If desired, a conventional optical (glass) bandpass filter 64 could be added ahead of the demultiplexer to block unwanted radiation bands.

In field operation, let it be assumed that the system has been calibrated for an initial sensor depth as above outlined. A seismic shot is fired. The direct and reflected seismic waves impinging upon the fluid column in the borehole create transient pressure perturbations in the fluid. The pressure perturbations are felt by the sensors as changes in the length and/or index of refraction of the optical-fiber resonators of the sensors. The parameter changes due to seismic waves are very small compared to the gross changes due to the depth differential between sensors. Accordingly, under dynamic conditions, seismic wave motion will modulate or dither the resonant wavelength with respect to the central maximum wavelength as determined under static conditions. Wavelength modulation therefore results in a shift in the resonant wavelength received at the demultiplexer relative to the central maximum such as 72 of pulse 66 as previously determined from static calibration (see FIG. 3). For example, let the incident seismic waves tend to red-shift the resonant wavelength of a particular pulse such as 66 towards 74 or 76 relative to central maximum 72. the electrical output of a corresponding photodetector, which would be I at the central maximum wavelength, will become a fraction of that amount, kI, for a red-shift towards 74 or 76. The fractional value will be proportional to the lengths of the dashed lines 74 or 76. The wavelength-shifts thus are recorded by the photodetectors as variations of intensity of the light flux at that particular wavelength. The intensity variations are converted to corresponding electrical signals by the photodetectors. The electrical signals are a function of the amplitude of the incident seismic waves and may be used for further data processing by the signal utilization device.

In an alternate embodiment, length-limited Bragg reflectors could be substituted for the optical-fiber cavity resonators. Also, a two-fiber transmission link could be used—one fiber for input chirp pulses and a second fiber for receiving the wavelengths-multiplexed pulse stream.

In another embodiment of this invention, the transient property sensed and used to modulate the resonant wavelength may be other than acoustic pressure of the medium. Only a part of the resonant coil (or one of a series of coils) is exposed to hydrostatic pressure while the other part is used to sense the property to be measured.

I claim as my invention:

1. A method of wavelength-division-multiplexing the output signals from a plurality of sensors each of which is located at a different depth within a fluid medium by employing the static pressure head at each sensor to control the wavelength of a carrier signal which is modulated by the transient output of the corresponding sensor.

* * * * *